United States Patent
Li et al.

(10) Patent No.: US 10,572,882 B2
(45) Date of Patent: *Feb. 25, 2020

(54) SYSTEMS AND METHODS FOR TRACKING AND RESPONDING TO MOBILE EVENTS IN A RELATIONSHIP MANAGEMENT SYSTEM

(71) Applicant: salesforce.com, inc., San Francisco, CA (US)

(72) Inventors: Jason Li, Mountain View, CA (US); Adam Evans, Redwood City, CA (US); Steve Loughlin, Los Altos, CA (US); Patricio Echague, Burlingame, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/789,905

(22) Filed: Oct. 20, 2017

(65) Prior Publication Data

US 2018/0041635 A1 Feb. 8, 2018

Related U.S. Application Data

(63) Continuation of application No. 15/005,992, filed on Jan. 25, 2016, now Pat. No. 9,883,033, which is a (Continued)

(51) Int. Cl.
*H04W 4/029* (2018.01)
*G06Q 30/00* (2012.01)
(Continued)

(52) U.S. Cl.
CPC .......... *G06Q 30/016* (2013.01); *H04W 4/029* (2018.02); *H04W 8/02* (2013.01); *H04W 68/04* (2013.01); *H04W 4/025* (2013.01)

(58) Field of Classification Search
CPC ....... H04W 4/02; H04W 4/021; H04W 4/027; H04W 4/04; H04W 4/12; H04W 28/02;
(Continued)

(56) References Cited

U.S. PATENT DOCUMENTS 5,577,188 A 11/1996 Zhu
5,608,872 A 3/1997 Schwartz et al.
(Continued)

FOREIGN PATENT DOCUMENTS

WO WO-2013030830 3/2013
WO 2013113028 A1 8/2013

OTHER PUBLICATIONS

Final Office Action for U.S. Appl. No. 14/080,076 dated Nov. 2, 2017, 77 pages.
(Continued)

*Primary Examiner* — Jean A Gelin
(74) *Attorney, Agent, or Firm* — Jaffrey, Watson, Mendonsa & Hamilton LLP

(57) ABSTRACT

A method and apparatus for tracking and responding to mobile events in a relationship management system is described. The method may include detecting a mobile event associated with a user of a relationship management system. Furthermore, the method may include analyzing the mobile event to determine at least one relationship management process associated with the user for which the mobile event is related. The method may also include generating one or more relationship management system notifications for transmission to the mobile device of the user prior to initiation of the mobile event, and generating one or more relationship management suggestions or relationship management system notifications for transmission to the mobile device of the user after a termination of the mobile event.

30 Claims, 9 Drawing Sheets

Related U.S. Application Data continuation of application No. 14/193,594, filed on Feb. 28, 2014, now Pat. No. 9,247,051.

(51) Int. Cl.
  *H04W 8/02* (2009.01)
  *H04W 68/04* (2009.01)
  *H04W 4/02* (2018.01)

(58) Field of Classification Search
  CPC ....... H04W 28/16; H04W 4/025; H04W 4/06; H04W 72/00
  USPC ...... 455/412.1, 412.2, 414.1, 458, 459, 515, 455/516, 517, 456.1
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,332,440 B2 | 12/2012 | Parker, III et al. |
| 8,429,518 B2 | 4/2013 | Machalek |
| 8,639,563 B2 | 1/2014 | Angell et al. |
| 8,688,698 B1 | 4/2014 | Black et al. |
| 8,755,297 B2 | 6/2014 | Kalavade |
| 8,880,640 B2 | 11/2014 | Graham et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0041167 A1 | 2/2003 | French et al. |
| 2003/0041238 A1 | 2/2003 | French |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0039814 A1 | 2/2004 | Crabtree et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0075917 A1 | 4/2005 | Flores et al. |
| 2005/0091098 A1 | 4/2005 | Brodersen et al. |
| 2005/0132069 A1 | 6/2005 | Shannon et al. |
| 2006/0268764 A1 | 11/2006 | Harris |
| 2007/0061421 A1 | 3/2007 | Karidi |
| 2007/0094217 A1 | 4/2007 | Ronnewinkel |
| 2007/0173226 A1* | 7/2007 | Cai ................. H04L 12/14 455/405 |
| 2007/0203820 A1 | 8/2007 | Rashid |
| 2008/0059314 A1 | 3/2008 | Kirchoff et al. |
| 2008/0114628 A1 | 5/2008 | Johnson et al. |

(56) References Cited

U.S. PATENT DOCUMENTS

| | | | |
|---|---|---|---|
| 2008/0248790 A1* | 10/2008 | Ophir | H04M 3/42042 455/415 |
| 2008/0254764 A1* | 10/2008 | Linquist | H04W 76/10 455/406 |
| 2008/0298575 A1* | 12/2008 | Rondeau | H04M 3/436 379/211.01 |
| 2008/0320001 A1 | 12/2008 | Gaddam | |
| 2009/0063242 A1 | 3/2009 | Shaouy | |
| 2009/0177744 A1 | 7/2009 | Marlow et al. | |
| 2009/0187515 A1 | 7/2009 | Andrew et al. | |
| 2009/0313067 A1 | 12/2009 | Costa et al. | |
| 2010/0094878 A1 | 4/2010 | Soroca et al. | |
| 2010/0257470 A1 | 10/2010 | Ari et al. | |
| 2011/0010236 A1 | 1/2011 | Trillana | |
| 2011/0022536 A1 | 1/2011 | Shivers et al. | |
| 2011/0066949 A1 | 3/2011 | Deluca et al. | |
| 2011/0184789 A1 | 7/2011 | Kirsch | |
| 2011/0206198 A1 | 8/2011 | Freedman et al. | |
| 2011/0218912 A1 | 9/2011 | Shivers et al. | |
| 2012/0036552 A1 | 2/2012 | Dare et al. | |
| 2012/0072500 A1 | 3/2012 | Greene et al. | |
| 2012/0079092 A1 | 3/2012 | Woxblom et al. | |
| 2012/0129507 A1* | 5/2012 | From | H04M 3/02 455/415 |
| 2012/0129517 A1 | 5/2012 | Fox et al. | |
| 2012/0150888 A1 | 6/2012 | Hyatt et al. | |
| 2012/0150978 A1 | 6/2012 | Monaco et al. | |
| 2012/0173452 A1 | 7/2012 | Dodge et al. | |
| 2013/0006987 A1 | 1/2013 | Stevenne | |
| 2013/0007036 A1 | 1/2013 | Childs et al. | |
| 2013/0024511 A1 | 1/2013 | Dunn et al. | |
| 2013/0030873 A1 | 1/2013 | Davidson | |
| 2013/0067039 A1 | 3/2013 | Hartzler et al. | |
| 2013/0073280 A1 | 3/2013 | O'Neil et al. | |
| 2013/0163741 A1* | 6/2013 | Balasaygun | H04M 3/4935 379/211.01 |
| 2013/0183937 A1* | 7/2013 | Neal | H04W 12/12 455/411 |
| 2013/0298038 A1 | 11/2013 | Spivack et al. | |
| 2013/0305169 A1 | 11/2013 | Gold | |
| 2013/0316724 A1 | 11/2013 | Saeedi et al. | |
| 2013/0339099 A1 | 12/2013 | Aidroos | |
| 2014/0007183 A1 | 1/2014 | Qureshi et al. | |
| 2014/0199962 A1 | 7/2014 | Mohammed et al. | |
| 2014/0229214 A1 | 8/2014 | Bernier et al. | |
| 2014/0241513 A1* | 8/2014 | Springer | H04M 3/493 379/88.01 |
| 2014/0258363 A1 | 9/2014 | Peco et al. | |
| 2014/0323158 A1 | 10/2014 | Wormald et al. | |
| 2014/0365283 A1 | 12/2014 | Stenneth | |
| 2014/0378091 A1 | 12/2014 | Irwin et al. | |
| 2015/0024717 A1* | 1/2015 | Kochhar | H04W 4/16 455/413 |
| 2015/0024718 A1* | 1/2015 | Zhidov | H04M 1/72547 455/413 |
| 2015/0036817 A1* | 2/2015 | Jain | H04M 3/5175 379/266.02 |
| 2015/0055769 A1* | 2/2015 | Sontag | H04M 3/42008 379/201.11 |
| 2015/0100356 A1 | 4/2015 | Bessler et al. | |
| 2015/0120587 A1 | 4/2015 | Bramel et al. | |
| 2015/0134693 A1 | 5/2015 | Chan et al. | |
| 2016/0094414 A1 | 3/2016 | Merenda et al. | |

OTHER PUBLICATIONS

Final Office Action for U.S. Appl. No. 15/005,992 dated May 4, 2017, 7 pages.

Non-Final Office Action for U.S. Appl. No. 15/005,992 dated Dec. 15, 2016, 11 pages.

Notice of Allowance for U.S. Appl. No. 14/050,125 dated Oct. 19, 2017, 8 pages.

Notice of Allowance for U.S. Appl. No. 15/005,992 dated Sep. 18, 2017, 7 pages.

Notice of Allowance for U.S. Appl. No. 14/193,594 dated Sep. 15, 2015, 7 pages.

Non-Final Office Action for U.S. Appl. No. 14/193,594 dated Apr. 14, 2015, 5 pages.

Final Office Action for U.S. Appl. No. 14/050,125 dated Sep. 8, 2016, 10 pages.

Final Office Action for U.S. Appl. No. 14/080,076 dated Oct. 17, 2016, 70 pages.

Non-Final Office Action for U.S. Appl. No. 14/050,125 dated Mar. 14, 2016, 9 pages.

Non-Final Office Action for U.S. Appl. No. 14/050,125 dated Mar. 9, 2017, 13 pages.

Non-Final Office Action for U.S. Appl. No. 14/080,076 dated Feb. 10, 2016, 58 pages.

Non-Final Office Action for U.S. Appl. No. 14/080,076 dated Mar. 31, 2017, 73 pages.

Non-Final Office Action for U.S. Appl. No. 14/080,076 dated Apr. 5, 2018, 80 pages.

Final Office Action for U.S. Appl. No. 14/080,076 dated Dec. 11, 2018, 20 pages.

* cited by examiner

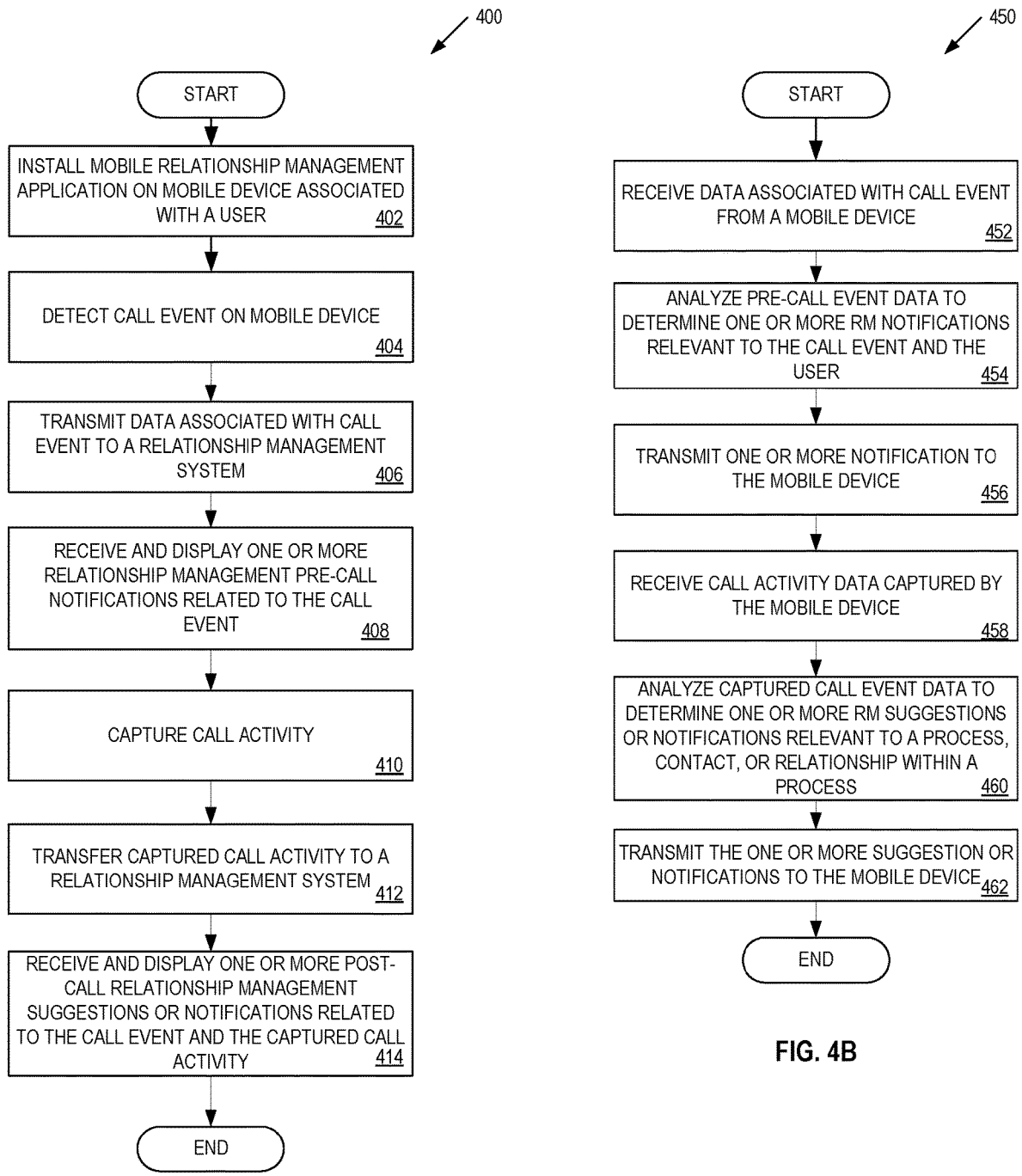

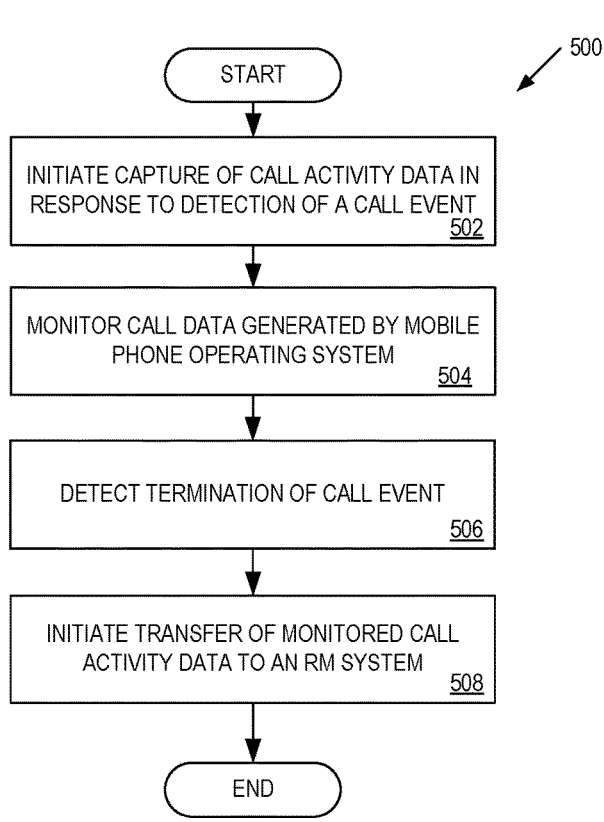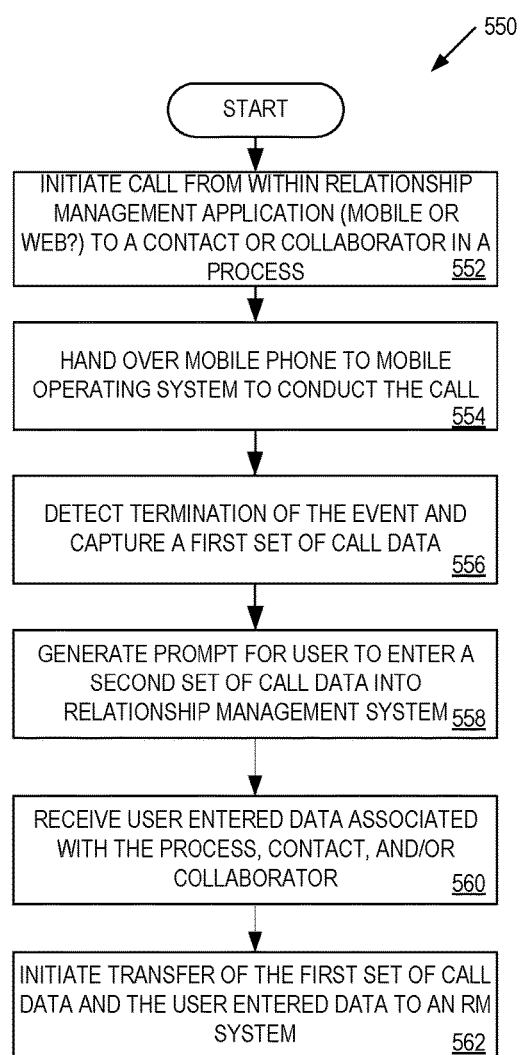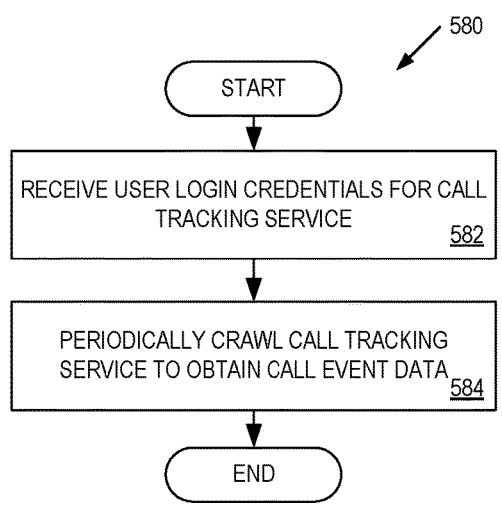
FIG. 5A
FIG. 5B
FIG. 5C

SYSTEMS AND METHODS FOR TRACKING AND RESPONDING TO MOBILE EVENTS IN A RELATIONSHIP MANAGEMENT SYSTEM

CLAIM OF PRIORITY

This continuation application is related to, and claims priority to, U.S. patent application Ser. No. 15/005,992, filed Jan. 25, 2016, which is a continuation of U.S. patent application Ser. No. 14/193,594, filed on Feb. 28, 2014, now U.S. Pat. No. 9,247,051 issued Jan. 26, 2016, the entire contents of which are both incorporated herein by reference.

TECHNICAL FIELD

Embodiments of the invention relate to the field of electronic communication management, and more particularly, to tracking and responding to mobile events in a relationship management system.

BACKGROUND

Customer relationship management (CRM) systems provide tools for managing interactions with customers. The interactions may include the flow of communications between a single user with a customer, such as the exchange of telephone calls, emails, in-person meetings, as well as other types of interactions. The interactions may also include the flow of communications of other users, such as multiple employees from a company, office, school, etc., interacting with a customer. CRM solutions collect a centralized record of these interactions. From the record of the interactions, CRM systems attempt to summarize and track the interactions in a meaningful way. Because users often are participating in several communication flows simultaneously, users often forget, delay, or otherwise mishandle interactions in the CRM system.

The problem becomes more acute when users rely on mobile devices for communications related to the CRM system. Mobile devices are often logically or conceptually separated from a CRM system access point, such as a user's computer system. Users may therefore perceive mobile communications as separated from CRM communications. Thus, communications and other relevant events that occur on a mobile device are often not provided to the CRM system, and the CRM system in turn fails to utilize the mobile device in a meaningful way for managing interactions with customers.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4A is a flow diagram of one embodiment of a method for processing telephone call event data on a mobile device and receiving relationship management system notifications.

FIG. 4B is a flow diagram of one embodiment of a method for generating notifications and suggestions for a telephone call event at a relationship management system.

FIG. 5A is a flow diagram of one embodiment of a method for capturing call event data at a mobile device.

FIG. 5B is a flow diagram of another embodiment of a method for capturing call event data at a mobile device.

FIG. 5C is a flow diagram of another embodiment of a method for capturing call event data at a mobile device.

DETAILED DESCRIPTION

Figure 1:
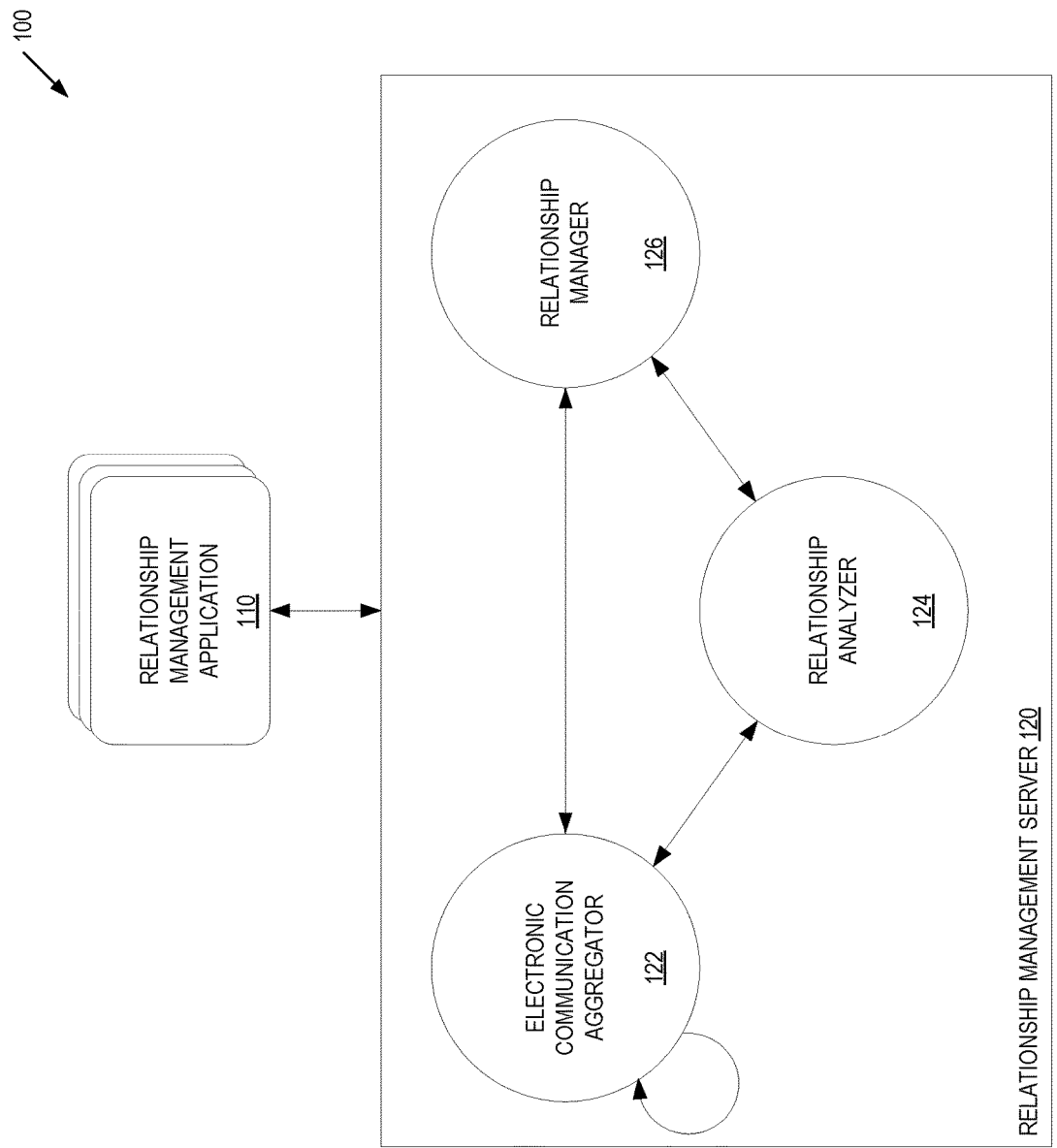
FIG. 1 is a block diagram illustrating an exemplary system for automatic and intelligent relationship management in accordance with an embodiment of the invention.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "analyzing", "generating", "receiving", "sending", "accessing", "locating", "extracting", "tracking", "applying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram illustrating an exemplary system 100 for automatic and intelligent relationship management, including mobile event tracking and notifications. In embodiments discussed herein, relationship management involves the capture, analysis, and reporting of communications between a single user, or multiple users, within an organization, and various contacts outside of the organization. When a user engages in communication, in concert with a group of users, from an organization, those users are said to be collaborators. Furthermore, when the user and/or collaborators engage in communication with contacts outside the organization for a specific purpose (e.g., sales, business, recruiting, funding, etc.), a relationship is formed. These communications, between relationships and collaborators, may be part of a series of sequential communication and action stages of a process, such as stages of a sales process (e.g., first contact, product demo, price quote, offer, close), a business development process (e.g., growth identification, partner identification, project assignment, growth tracking), a recruiting process (e.g., candidate contact, resume obtained, initial interview, follow-up interview, offer or decline), as well as other processes which are, or can be, carried out with electronic communications. These communications, once identified as belonging to one or more processes, may then be viewed by users and collaborators involved in the particular process. Furthermore, reports may be generated which summarize, provide different visualizations, show progression within a process, and provide feedback on the progression within a process.

In one embodiment, the system 100 for automatic and intelligent relationship management automatically performs various relationship management tasks, such as obtaining electronic communications, tracking mobile events, tracking communications and mobile events within a process, automatically generating suggestions/notifications for users and collaborators, suggesting team members to add as new collaborators, suggesting external contacts to add as relationships to a process, etc. Furthermore, in one embodiment, the system 100 intelligently interprets the relationship management data, automatically culls contact information from the communications on a periodic or ongoing basis, deduplicates contact information, merges contact information obtained from different sources, combines relationship analysis results obtained from different communication channels, as well as performing other types of intelligent data analysis as discussed herein.

In one embodiment, users interact with the relationship management server 120 through a relationship management application 110. In one embodiment, relationship management application 110 is an application executed on a general purpose computing system, such as a desktop computer, a laptop computer, server computer, as well as other computing system. In one embodiment, the relationship management application 110 may also be executed on a mobile device, such as a smartphone, tablet, palmtop, as well as other mobile computing devices.

In one embodiment, relationship management application 110 initially receives a user request to register with relationship management server 120. Relationship management application 110 receives user registration data and indication of one or more digital identities associated with the user. The digital identities may include email addresses, social networking identities, telephone numbers, and other electronic communication identities, and their associated authentication credentials.

In one embodiment, relationship management server 120 receives the user registration data, specification of one or more digital identities, and corresponding authentication credentials, and then automatically and intelligently generates a relationship management system for the user. In one embodiment, the relationship management system is generated as set forth in U.S. patent application Ser. No. 14/050,125, filed Oct. 9, 2013, and entitled "SYSTEMS AND METHODS FOR AUTOMATIC GENERATION OF A RELATIONSHIP MANAGEMENT SYSTEM," which is incorporated into the present application in its entirety.

In one embodiment, electronic communication aggregator 122 of relationship management server 120 utilizes the received user digital identities, and associated authentication credentials, to cull and ingest electronic communications from the various sources identified by the registering user. In one embodiment, electronic communication aggregator 122 accesses the electronic communication systems to obtain electronic communications between the user and potential and/or existing relationship management contacts. For example, electronic communication aggregator 122 utilizes an email address and password to access existing email messages on one or more email provider systems (not shown), such as the GMAIL™, EXCHANGE™, etc., to access existing electronic communications on social network system (not shown), such as FACEBOOK™, TWITTER™, LINKEDIN™, etc., to access voice over internet protocol (VOIP) system communication records, to access electronic calendar systems, to access cellular telephone system records, to access video conferencing system records, as well as other existing electronic communications and/or records at the specified electronic messaging systems.

From the obtained electronic communications, relationship analyzer 124 automatically generates one or more suggestions for the user. In one embodiment, potential contact data can be identified from recipient data in outgoing email messages, social networking posts, VOIP calls, etc., sender data in incoming email messages, social networking posts, VOIP calls, etc. In one embodiment, potential contact data may also be identified within the context of the electronic communication, such as within the text of a message, from specific portions of the text, such as an electronic communication signature extracted from the text, etc. Various pre-learned machine learning models, such as one or more natural language analysis, decision tree, neural network, support vector machines, conditional random fields, unsupervised learning (e.g. clustering), etc. techniques can be deployed by the relationship analyzer 124 to identify potential contacts, and data associated with the potential contacts from, for example, the signature within the text of a communication. In one embodiment, the potential contact data may be present to a user as a suggestion to add the potential contact as an actual contact within the relationship management system created for the user.

In the embodiments discussed herein, relationship analyzer 124 interacts with relationship manager 126 to store a record of the automatically extracted contact information. In one embodiment, since data associated from a contact may be obtained from multiple sources, such as from two electronic communication types associated with a single user, different communications from two or more users, over different communication channels, etc., relationship analyzer 124 deduplicates contact information, obtained from different sources, into the same contact. Furthermore, the additional sources of potential contact information for a single contact enable relationship analyzer 124 and relationship manager 126 to refine contact details, update existing contacts with new contact data, add missing contact details, etc. For example, data extracted from a first user's communication might result in the contact John Doe with an email address of john@service1, and data extracted from a second user's communications may indicate that John R. Doe's phone number is 123-456-7890. In one embodiment, relationship analyzer 124, via the machine learning model analysis of the communications, such as inclusion of the same signature at the end of the text portions of different communications, may determine that John Doe and John R. Doe are the same person, and may merge the contact information and remove the duplicate contact entries. In one embodiment, the merging of contact information may be performed automatically by relationship analyzer 124, or by relationship analyzer 124 generating a suggestion or mobile event notification for a user suggestion to merge contact data. For example, relationship analyzer 124 may suggest to a user that John Doe and John R. Doe are the same person based on analyzing the names, without analyzing additional data from electronic communications. However, further analysis by relationship analyzer 124 on signatures within the electronic communications, text within the electronic communications, phone numbers located within the electronic communications, patterns of communications, as well as other factors, can also yield a match between John Doe and John R Doe. As will be discussed in greater detail below, a potential match made by relationship analyzer 124 may be accompanied by a confidence level of the match, such that when the confidence level exceeds a threshold, the contact information may be merged automatically by relationship analyzer 124. However, when the confidence level does not exceed the threshold, relationship analyzer 124 generates a suggestion for the user to merge the contact information.

In one embodiment, relationship analyzer 124 may additionally analyze the electronic communications obtained by electronic communication aggregator 122 to automatically determine a process associated with a user and one or more of the user's contacts. For example, if communications between a user and John Doe frequently use words indicative of a sale of a product, electronic communication aggregator 122 may automatically suggest a sales process be started, and that contacts (such as John Doe) be added as relationships within the process. In another embodiment, a registering, or existing user, may manually select a process, and the contacts to be added as relationships within the process, contacts to be added as collaborators, etc. In yet another embodiment, a combination of automated analysis and user selection can be employed to define a process, contacts that are to be relationships within the process, contacts that are to be added as collaborators with the process, and any customizations within the process (e.g., addition or deletion of one or more sequential stages in the process, data fields to be added to a process stage, specification of a communication and/or event that will cause a process to progress, etc.).

Relationship management application 110 may then be used by a user to interact with a relationship management system generated by the relationship management server 120. In one embodiment, relationship management application 110 is deployed on a mobile device, and is configured to receive one or more relationship management notifications in response to various mobile events. As will be discussed in greater detail below, relationship management application 110 may receive relationship management notifications at the mobile device at the beginning and end of a mobile call event, such as in response to an incoming telephone call or outgoing telephone call. Relationship management application 110 may also receive relationship management notifications at the mobile device before and after of a calendar event, such as scheduled meeting, reminder, etc.

Furthermore, as discussed in greater detail below, relationship management application 110 can track one or more mobile events that occur on a mobile device. For example, a mobile telephone call can be tracked by capturing incoming or outgoing telephone numbers, a duration of the call, whether the call was initiated by the user, and whether the call was initiated within the relationship management application. In one embodiment, the occurrence of a mobile event, and the tracked information gathered during the mobile event, are provided to the relationship management server 120 to enable the relationship management server 120 to generate one or more notifications.

The relationship management server 120, in embodiments discussed herein, receives call data and identifies calendar events in order to generate mobile event notifications. In one embodiment, the mobile event notifications may provide one or more of relevant contact information, contact information list membership, process identification associated with a user and the communications between relationships and collaborators within the process, as well as to provides additional intelligence, such as latest communication, time since last communication, who contacted a relationship within a process, which team member should follow up with a relationship, etc. Furthermore, as discussed herein, relationship analyzer 124 analyzes the obtained mobile event data to automatically and intelligently generate the mobile event notifications. In one embodiment, the automatic suggestions are generated from machine learning model analysis of the text of a calendar event (i.e., text includes "Weekly meeting with John Doe from Corporation . . . "), fields of the communication (e.g., message headers, metadata fields, to fields, from fields, attachments, etc.), a pattern or history of telephone call events between specific numbers, etc. In one embodiment, the automatically generated notifications may include one or more suggestions for a user to add a contact as a relationship within a new or existing process, suggestions for a user to add a collaborator to a new or existing process, suggestions for a user to follow up with a relationship or collaborator, and suggestions to follow up with a relationship or collaborator for a meeting.

In one embodiment, relationship analyzer 124 generates the mobile event notifications and suggestions based on a pattern, history, or timing of communications between the user and a contact, relationship, and/or collaborator. For example, relationship analyzer 124 can determine that an employee typically responds to John Doe's telephone calls within two business days based on a pattern associated with prior telephone calls, and then generates a notification or calendar event for the user that reminds the user to follow up with John Doe. In one embodiment, relationship analyzer 124 monitors the behaviors of a user with respect to their communication activities (e.g., new communications, responses to existing communications, timing of communications, number of communications sent to specific users, attributes of the users to which a user is communicating, how a user responds to specific types of suggestions, etc.). From the monitored behaviors, relationship analyzer 124 generates a suggestion profile for the user that describes a user's observed preferences with respect to the generation of suggestions. For example, a suggestion generated for a user may indicate that the user should follow up with meeting participants. However, the user may exhibit a pattern of dismissing all such suggestions, ignoring such suggestions, etc. In one embodiment, relationship analyzer 124 recognizes these patterns of behavior, and subsequently reduces or eliminates the generation of meeting follow-up suggestions for the user.

The updated information, process updates, automatically generated suggestions, mobile event notifications, etc. may then be presented to a user via the relationship management application 110.

Figure 2A:
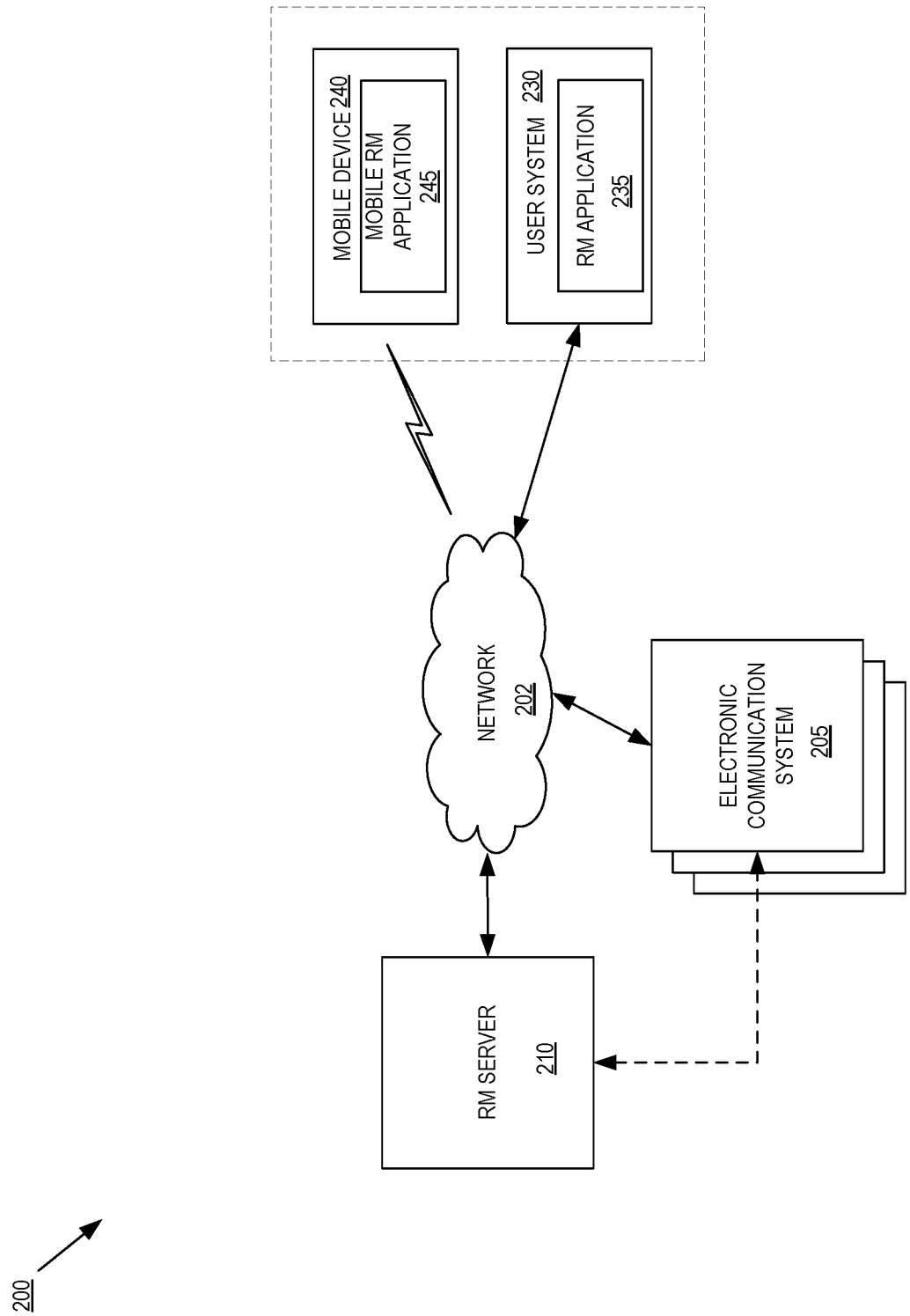
FIG. 2A is a block diagram of exemplary system architecture for providing a relationship management system in accordance with an embodiment of the invention.

FIG. 2A is a block diagram of exemplary system architecture for providing a relationship management system.

In one embodiment, the system 200 includes user system 230, mobile device 240, relationship management (RM) server 210, and a plurality of electronic communication systems 205. In one embodiment, user system 230 may be a personal computing device, such as a desktop computer, laptop computer, tablet computer, etc. In one embodiment, mobile device 240 may be a mobile computing device, such as a mobile telephone, personal digital assistant, tablet, etc. The relationship management server 210 and electronic communication system 205 may also be computing devices, such as server computers, desktop computers, etc.

The user system 230, mobile device 240, relationship management server 210, and electronic communication system 205 may be coupled to a network 202 and communicate with one another using any of the standard protocols for the exchange of information. In one embodiment, mobile device 240 is coupled with network 202 via a wireless connection, such as a cellular telephone connection, wireless fidelity connection, etc.

In one embodiment, user system 230, mobile device 240, relationship management server 210, and the plurality of electronic communication systems 205 may run on one Local Area Network (LAN) and may be incorporated into the same physical or logical system, or different physical or logical systems. Alternatively, the user system 230, mobile device 240, relationship management server 210, and the plurality of electronic communication systems 205 may reside on different LANs, wide area networks, cellular telephone networks, etc. that may be coupled together via the Internet but separated by firewalls, routers, and/or other network devices. In yet another configuration, the relationship management server 210 and one or more of the electronic communication systems 205 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, the relationship management (RM) applications 235 and 245 may be applications presented to a user via a web interface, stand-alone applications installed on user system 230 or mobile device 240, or a combination of application types. In one embodiment, relationship management application 235 and mobile relationship management application 245 are user applications that enable a user to register with relationship management server 210 for the automatic and intelligent creation of a relationship management system, to receive mobile event notifications of automatically generated notifications and suggestions within a relationship management system, and to respond or otherwise interact with automatically generated notification and suggestions in the relationship management system, as discussed in greater detail below. In one embodiment, the same user can access the relationship management server 210 via the different relationship management applications 235 and 245. Furthermore, as discussed in greater detail below, relationship management application 235 may be utilized to initiate various actions, such as mobile telephone calls, on mobile device 240.

Figure 2B:
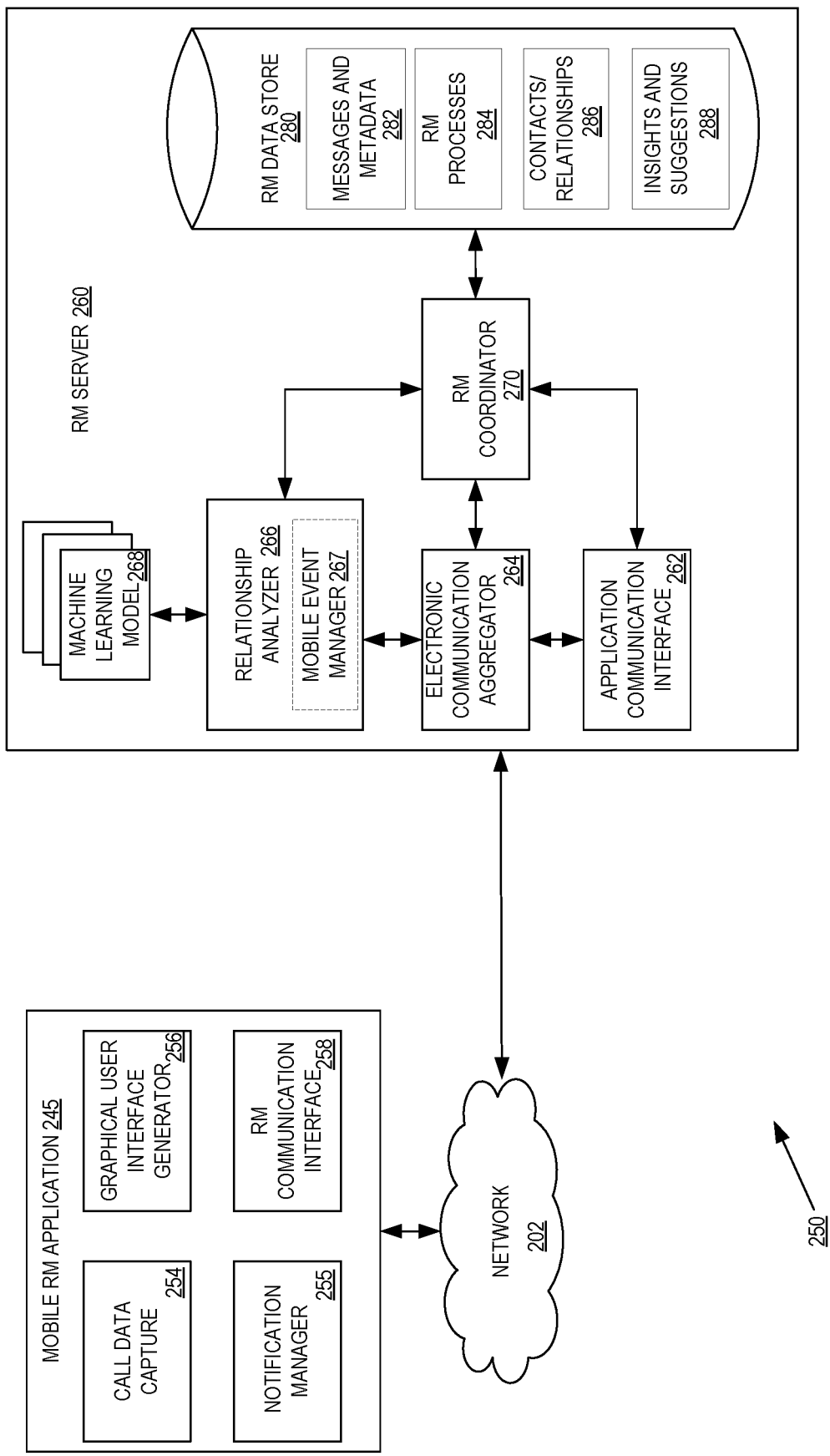
FIG. 2B is a block diagram of one embodiment of a relationship management server and a relationship management application run on a user system.

FIG. 2B is a block diagram of one embodiment 250 of a mobile relationship management application 245 and a relationship management (RM) server 260. Mobile relationship management application 245 and a relationship management server 260 provide additional details for the relationship management application and a relationship management server discussed above in FIGS. 1 and 2A.

In one embodiment, mobile relationship management application 245 includes a relationship management (RM) communication interface 258, graphical user interface generator 256, call data capture 254, and notification manager 255. Relationship management server 260 includes an application communication interface 262, electronic communication aggregator 264, relationship analyzer 266, mobile event manager 267, one or more machine learning models 268, relationship management (RM) coordinator 270, and relationship management (RM) data store 280. In one embodiment, the mobile relationship management application 245 and a relationship management server 260 communicate with each other over various networks and network configurations as discussed above in FIG. 2A.

In the mobile relationship management application 245, graphical user interface generator 256 is responsible for generating an interface for a user for accessing the relationship management application. In embodiments discussed herein, the mobile relationship management application 245 may generate the application interface as a web page, a standalone application, or a mobile application, based upon the type of computing system upon which the mobile relationship management application 245 is executed.

In one embodiment, relationship management communication interface 258 transmits a username, and authentication credentials to the application communication interface 262 of the relationship management server 260 for providing access to one or more relationship management systems associated with a user. In one embodiment, the relationship management systems have been automatically and intelligently created for the user as set forth in U.S. patent application Ser. No. 14/050,125, filed Oct. 9, 2013, and entitled "SYSTEMS AND METHODS FOR AUTOMATIC GENERATION OF A RELATIONSHIP MANAGEMENT SYSTEM," which is incorporated into the present application in its entirety. In one embodiment, relationship management communication interface 258 and application communication interface 262 communicate with one another using standard communications protocols, such as HTTP, HTTPS, etc. Additionally, the data exchanged between relationship management communication interface 258 and application communication interface 262 may be exchanged as a single message, or a series of messages.

Application communication interface 262 provides the relationship management username/password combination to relationship management coordinator 270, which authenticates the user based on the received username and password. Relationship management coordinator 270 further utilizes the username, once authenticated, to load a relationship management system associated with a user from relationship management data store 280. The relationship management coordinator 270 further retrieves any automatically generated suggestions available for the user by querying insights and suggestions 288 storage. In one embodiment, the retrieved suggestions may be selected by relationship management coordinator based on a priority associated with the suggestions, based on a time associated with the presentation of the suggestion, based on suggestion generator's determination of which suggestions to present to a user (e.g., based on a user history, suggestion profile, etc.), as well as other factors. Relationship management coordinator 270 provides the relationship management system data and suggestion data to mobile relationship management application 245 for presentation to a user. In one embodiment, as discussed herein, relationship management coordinator 270 continuously or periodically sends new and/or updated relationship management system data and suggestion data as the data becomes available in near real time. In another embodiment, relationship management coordinator 270 sends mobile event notifications in response to the beginning and/or end of various mobile events, as discussed in greater detail below.

Relationship management coordinator 270 further provides the user's authentication credentials for the various electronic communications systems to electronic communication aggregator 264. Electronic communication aggregator 264 utilizes the user's authentication credentials to access the electronic communication systems 205 (not shown) via network 202 or locally. Initially, electronic communication aggregator 264 obtains all, or at least a portion, of the user's past communication activities on each of the electronic communication systems 205. In one embodiment, the access credential enable electronic communication aggregator to access electronic mail communications, microblogging communications, telephone communication records, electronic calendars maintained at the electronic communication systems 205, etc.

In one embodiment, after an initial exchange of security data (i.e., username, password, and authentication credentials) between the mobile relationship management application 245 and relationship management server 260, and between the relationship management server 260 and one or more electronic communications systems, relationship management server 260 may generate and distribute one or more tokens that are substituted for the security data. In this embodiment, the tokens are thereafter used for accesses to the relationship management server and/or the various electronic communications systems. Furthermore, the tokenization of the sensitive user data helps to safeguard the data.

These communications, communication records, calendar events, etc. are provided to relationship analyzer 266 to enable mobile event manager 267 to apply one or more machine learning models 268 to analyze the communications, communication records, calendar events, etc. for automatic suggestion generation, as well as for mobile event notification. In one embodiment, the machine learning models are pre-trained machine learning methods, such as one or more natural language analysis, support vector machines, conditional random fields, unsupervised learning (e.g., clustering), etc. In one embodiment, mobile event manager 267 applies the machine learning model 268 in order to extract contact information from the user's communication with other users (i.e., names, phone numbers, email addresses, job titles, affiliated companies, web sites, etc.), extract contact details, attendee lists, meeting topics, etc. from calendar events, extract mobile call data from a telephone system record, and perform natural language analysis or other machine learning based analysis on the content of the extracted data.

Mobile event manager 267 provides the results from the machine learning model analysis to relationship management coordinator 270 for storage in the insights and suggestions 288 database in relationship management data store 280. In one embodiment, when electronic communication aggregator 264 passes the obtained electronic communications to relationship analyzer 266 and/or mobile event manager 267, the electronic communications are also passed to relationship management coordinator 270 for storage in a messages and metadata database 282 in relationship management data store 280. In one embodiment, electronic communication aggregator 264 periodically queries electronic communication systems 205 for new data (e.g., new calendar events, new telephone calls, new email communications, new blog posts, etc.) to ensure that any suggestions or suggestions reflect a current state of the user.

In one embodiment, mobile relationship management application 245 notifies relationship management server 260 of the initiation and termination of a mobile telephone call event. In one embodiment, the initiation of a mobile telephone call event occurs when a user receives an incoming call or begins to place an outgoing telephone call, but has not yet accepted or placed the telephone call. The termination of the mobile telephone call event occurs when the call ends. In one embodiment, call data capture 254 records communication data, such as telephone call data entered by a user, incoming caller identification data, call duration, call termination time, etc. for received calls, calls initiated within mobile relationship management application 245, calls received or initiated outside of mobile relationship management application 245, or a call that is initiated on a device that is executing another relationship management application (e.g., user system 230). In one embodiment, the call data is transferred to relationship management server 260 prior to the call being placed or accepted, and at the termination of a call.

In one embodiment, the call data is provided to relationship analyzer 266 in order to generate pre-call and post-call notifications. Mobile event manager 267 analyzes the call data by querying relationship management data store 280 for any notifications, relationship management (RM) processes 284, contacts/relationships 286, or insights and suggestions 288 related to the call data. For example, if an incoming or outgoing call is determined to involve John Doe, mobile event manager can query relationship management data store 280 to locate pertinent details, suggestions, or other notifications associated with John Doe. In one embodiment, mobile event manager 267 may also use one or more of the pre-trained machine learning models 268 for the generation of automatic suggestions or notifications in response to the receipt of the call data.

In one embodiment, and as discussed in greater detail below, after a call event is initiated and prior to a user actually accepting or placing the call, the time available to capture call data on a mobile device executing mobile relationship management application 245, transfer the call data to relationship management server 260, have relationship management server 260 perform queries for notifications, process data, contact information etc., and then return the data to the mobile relationship management application 245, is brief. Thus, in one embodiment, mobile event manager 267 queries relationship management data store 280 for a subset of data related to the call event. For example, based on an identified number of an incoming or outgoing call, relationship management server 260 may provide mobile relationship management application 245 with a user associated with the identified number, relevant contact information (i.e., corporation, title, location, etc.), a process to which the identified user belongs, a status of the process, one or more automatically pre-generated suggestions stored in insights and suggestions 288, etc. In one embodiment, the pre-generated notifications and suggestions can be pre-generated and stored in relationship management data store 280 in accordance with the automatic suggestion generation techniques described in U.S. patent application Ser. No. 14/080,076, filed Nov. 14, 2013, entitled "Systems and Methods for Automatic Suggestions in a Relationship Management System," which is incorporated herein in its entirety.

Similarly, and as discussed in greater detail below, mobile relationship management application 245 can inform relationship management server 260 of the termination of a mobile telephone call. In one embodiment, mobile event manager 267 processes the call data to locate additional notifications and/or suggestions for the user, as well as to generate new suggestions and/or notifications based on the call data. For example, mobile event manager 267 can determine from a history of calls that the mobile event was a regularly repeating event, a call back, a call within a process, etc., and generate a suggestion to schedule a future call. Similarly, the suggestion may be a request to a user of the mobile relationship management application 245, such as a request for the user to enter call notes, update a status or progress for a process, add a call number to a new or existing process, schedule a follow-up, etc.

In one embodiment, as discussed in greater detail below, a user may also provide relationship management server 260 with access credentials to one or more electronic calendars. In this embodiment, mobile event manager 267 generates relevant relationship management notifications and/or suggestions prior to calendar events, as well as after the scheduled termination of a calendar event. In order to generate the notifications and/or suggestions for calendar events, mobile event manager 267 periodically accesses the electronic calendars utilizing a user's access credentials, locates scheduled events, and schedules the delivery of pre and post calendar event notifications and suggestions. In one embodiment, mobile event manager 267 may also receive data relevant to calendar events from mobile relationship management application 245, where the data is obtained by the mobile relationship management application 245 from one or more user calendars maintained locally on a mobile device.

In the embodiments discussed herein, relationship management information that is relevant to a mobile event is provided to a user of mobile device at the initiation of the event. By providing the relevant information before the event, the user is better informed as to the context surrounding the mobile event. For example, before answering a telephone call, a user is provided with information, such as, a process to which the caller belongs, the caller's company, the caller's title, etc. As another example, before a scheduled calendar event occurs, the user is again provided with relevant relationship management information, such as attendees and their associated processes, contact details, etc. Finally, at the termination of a mobile call or scheduled calendar event, a user may be provided with notifications and suggestions as to when to follow up with a caller or meeting attendee based on past history, asked whether notes should be entered into the relationship management system, asked whether a process should be updated, etc. Thus, a user can be prompted to provide relevant relationship management information immediately after, or within a specific time of, the termination of a mobile event, while the information corresponding to the mobile event is still fresh to the user.

Figure 3:
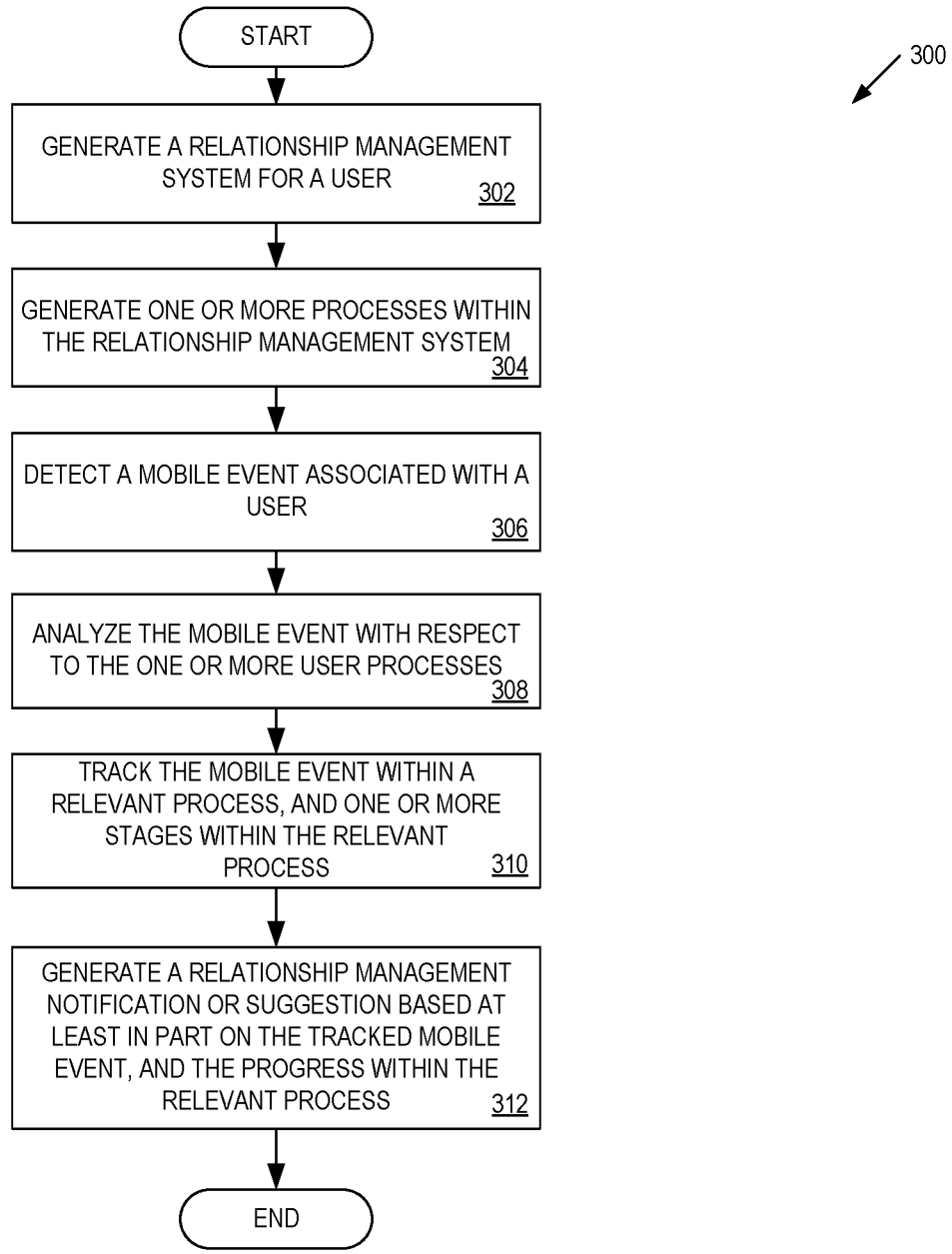
FIG. 3 is a flow diagram of one embodiment of a method for tracking and responding to mobile events in a relationship management system.

FIG. 3 is a flow diagram of one embodiment of a method 300 for tracking and responding to mobile events in a relationship management system. The method 300 is performed by processing logic that may comprise hardware (circuitry, dedicated logic, etc.), software (such as is run on a general purpose computer system or a dedicated machine), firmware, or a combination. In one embodiment, the method 300 is performed by a relationship management application (e.g., relationship management application 110, 235, or 245) and a relationship management server, such as relationship management server (e.g., 120, 210, or 260).

Referring to FIG. 3, processing logic begins by generating a relationship management system for a user (processing block 302). As discussed herein, when a user registers with a relationship management system, the user identifies one or more electronic communication systems, and provides their access credentials for the corresponding systems. Processing logic utilizes these access credentials to obtain the electronic communications on a continuous or periodic basis in order to generate the relationship management system. Processing logic then generates one or more processes within the relationship management system (processing block processing block 304). In one embodiment, the processes involve a sequential series of stages of communication between relationships and collaborators, as discussed above.

In one embodiment, processing logic detects a mobile event associated with a user (processing block 306). In one embodiment, the mobile event is a mobile telephone call event, such as the initiation of a telephone call at a mobile device by a user, or receipt of an incoming telephone call on the user's mobile device. The mobile telephone event may include other types of mobile communication events, such as receipt of text messages, receipt of social networking post, etc. In another embodiment, the mobile event is a calendar event, and processing logic detects the calendar event by accessing one or more electronic calendars with the user's access credentials. Embodiments for the detection and processing of mobile telephone call events is discussed in greater detail below in FIGS. 4A-6B, and embodiments for the detection and processing of calendar events is discussed in greater detail below in FIGS. 7A-7B.

Processing logic analyzes the mobile event with respect to one or more processes (processing block 308). In one embodiment, data associated with the mobile event is either received by processing logic, or obtained by processing logic. For example, detection of a mobile telephone call event could include receipt of a number of another party to the call, a name selected by a user from an address book, etc. As another example, detection of a calendar event could include accessing a scheduled meeting to determine a meeting location, topic, duration, and a list of attendees. In one embodiment, processing logic utilizes this data to query the relationship management system created for the user in an attempt to determine at least one process to which the mobile telephone call event belongs, contact details relevant to the mobile event, stages of a relationship management process, etc.

Processing logic tracks the mobile event within a relevant relationship management process, and with respect to one or more stages within the relevant process (processing block 310), and generates a relationship management notification or suggestion based at least in part on the tracked mobile event, and the progress within the relevant process (processing block 312). In one embodiment, the notification is generated by processing logic by a query of pre-existing data within a relationship management data store, such as data store 280. In another embodiment, the notification is pre-generated, or generated on-the-fly by analysis of the mobile event data, in the context of a corpus of relationship management system data, and application of one or more machine learning models. The notifications can include additional data that is related to the mobile event data. The notifications can also include suggestions, such as adding a contact when a mobile event has unknown data, linking the mobile event data to an existing contact in a relationship management system, generating a notification to add information into a relationship management system, etc.

In one embodiment, the process returns to processing block 306 to detect additional mobile events. The additional mobile events could be detection of the termination of the original mobile event. The additional mobile events could also be new mobile events, as well as mobile events of different types.

FIG. 4A is a flow diagram of one embodiment of a method 400 for processing telephone call event data on a mobile device and receiving relationship management system notifications. The method 400 is performed by processing logic that may comprise hardware (circuitry, dedicated logic, etc.), software (such as is run on a general purpose computer system or a dedicated machine), firmware, or a combination. In one embodiment, the method 400 is performed by a relationship management application (e.g., relationship management application 110, 235, or 245) executed on a mobile device.

Referring to FIG. 4A, processing logic begins by installing a mobile relationship management application on a mobile device associated with a user (processing block 402). In one embodiment the application is a mobile application for interfacing the mobile device with a relationship management server. A call event is then detected on the mobile device (processing block 404). In one embodiment, the relationship management application runs as a background process on the mobile device to identify when a call is received at the mobile device. In another embodiment, the mobile device is configured to wake and/or notify the relationship management application of mobile telephone call event. Further as discussed above, the mobile telephone call event could be the receipt of an incoming call, as well as the initiation of an outgoing call by a user of the mobile device.

Prior to the call be accepted by the user, as well as prior to the call being placed by the user, processing logic transmits data associated with the call event to a relationship management system (processing block 406). In one embodiment, processing logic transmits an identification for the user and a phone number associated with the call event, although other forms of data could be transmitted instead of, or in addition to, the phone number and user identification. Processing logic then receives and displays one or more relationship management pre-call notifications related to the call event (processing block 408). In one embodiment, the notifications are relevant to the telephone number extracted from the call event in the context of the relationship management system. For example, processing logic of the mobile device may receive a notification such as "John Doe is president of Corporation. He is a contact in process X, which is at stage Y." In one embodiment, a pre-call notification can include one or more of a title associated with a relationship or collaborator participating in a call, a company associated with the relationship or collaborator, one or more processes to which another party to a call belongs, a current status or progress for one or more stages in the processes, data relevant to a process (e.g., the industry related to a contact's associated corporation, a dollar amount associated with a process, etc.), date of a last communication with the contact, as well as other relevant relationship management data.

In one embodiment, the transmission of the call event data, as well as the receipt and display of the relationship management system notifications occurs before the call is accepted (i.e., before a user answers a telephone call), or before a call is placed (i.e., before the user commands phone to place the call). Thus, useful information that is relevant to one or more relationship management processes is obtained and presented to a user before a user commits to a telephone call. The information is invaluable to the user by providing the user with a context, contact information, and other relationship management information, prior to accepting/placing a call.

Processing logic then captures call activity during the duration of the call event (processing block 410). In one embodiment, the call activity may include data such as the telephone number, a duration of a call, whether the call was outgoing, whether the call was incoming, a state of the call as answered or missed, whether the call was a conference call, etc. Embodiments for capturing call activity are discussed in greater detail below in FIGS. 5A-5C. The call activity is transferred to a relationship management system at the termination of the call event (processing block 412).

Processing logic receives and displays one or more post-call relationship management notifications or suggestions related to the call event and captured call activity (processing block 414). As discussed herein, the call event, as well as captured call activity, is provided to a relationship management system to become part of a corpus of available relationship management data. Furthermore, this new data can be analyzed by one or more machine learning models to determine one or more follow-ups based on a pattern relevant to the telephone call (e.g., suggest user send an email since user frequently emails other part to the call after similar call events), to determine a meeting that should be scheduled (e.g., suggest user to schedule a meeting since user frequently has a post-call meeting), to suggest that the user enter additional data discussed during the call (e.g., notes, impressions, to-do items, etc.), to suggest to the user to perform a relationship management action (e.g., advance a process, combine contacts, suggest a collaborator joint a process, etc.).

Therefore, relevant relationship management data is provided to a user prior to a call, and one or more suggestions or notifications are presented to the user after the call. The user is then able to supply the relationship management system with additional data, in response to post-call notifications and/suggestions, that is relevant to a relationship management process, and which would otherwise not be entered into the relationship management system.

FIG. 4B is a flow diagram of one embodiment of a method 450 for generating notifications and suggestions for a telephone call event at a relationship management system. The method 400 is performed by processing logic that may comprise hardware (circuitry, dedicated logic, etc.), software (such as is run on a general purpose computer system or a dedicated machine), firmware, or a combination. In one embodiment, the method 450 is performed by a relationship management server, such as relationship management server (e.g., 120, 210, or 260).

Referring to FIG. 4B, processing logic begins by receiving data associated with a call event from a mobile device (processing block 452). In one embodiment the received data is the data transmitted by the mobile device in processing block 406. Processing logic utilizes the pre-call event data to determine one or more relationship management notifications relevant to the call event and the user (processing block 454). In one embodiment, processing logic utilizes the user identification to query contact lists, processes, pre-generated suggestions, and other relationship management data maintained at a relationship management server, which is associated with the user. In one embodiment, processing logic only performs a query for a small set of data to ensure that the query results can be obtained in a sufficiently small amount of time. Processing logic utilizes the determined notification data to transmit one or more notifications to the mobile device (processing block 456).

Processing logic then receives the call activity data captured by the mobile device (processing block 458). As discussed above, processing logic utilizes the received captured call activity data to determine one or more relationship management notifications or suggestions relevant to a process, contact, or relationship within a process (processing block 460). In one embodiment, processing logic then transmits one or more notifications or suggestions to the mobile device (processing block 462). The notifications and/or suggestions may include the notifications and suggestions generated in processing block 460. The suggestions may also include suggestions for a user to supply additional information relevant to the mobile event and/or process that was discussed, and is not otherwise available, from the captured call data.

In one embodiment, the pre-call and post-call notifications and suggestions are selected by processing logic based on user messaging preferences, when such notification and suggestions are determined by processing logic to satisfy an importance threshold, based on timing and presentation limitations associated with a user device, as well as other factors relevant to presentation of the notifications and suggestions to a user, Therefore, processing logic, in one embodiment, may decide what relationship management data, among all relevant data associated with the call activity, should be presented to the user before and after the mobile event.

FIG. 5A is a flow diagram of one embodiment of a method 500 for capturing call event data at a mobile device. The method 500 is performed by processing logic that may comprise hardware (circuitry, dedicated logic, etc.), software (such as is run on a general purpose computer system or a dedicated machine), firmware, or a combination. In one embodiment, the method 500 is performed by a relationship management application (e.g., relationship management application 110, 235, or 245) executed on a mobile device.

Referring to FIG. 5A, processing logic begins by initiating capture of call activity in response to detection of a call event (processing block 502). In one embodiment, processing logic is a background processing running on mobile device that monitors for call activity. In another embodiment, a mobile operating system notifies and/or wakes processing logic in response to a call event. Processing logic then monitors call data generated by the mobile phone operating system (processing block 504). In one embodiment, processing logic accesses one or more telephone functions of a mobile device, which are exposed by the operating system of the mobile device. For example, mobile device may run an ANDROID™ based mobile operating system, which exposes telephone functions relevant to call data capture. Other transparent mobile operating systems could be utilized in accordance with the discussion below. In one embodiment, the call data may include a telephone number of an incoming call, a telephone number entered number as an outgoing call, a duration of a call, whether a phone number is in an address book on the mobile device, data available from existing address book entries on the mobile device, etc. Processing logic then detects termination of the call event (processing block 506), and transfers the monitored call activity data to a relationship management system (processing block 508).

In one embodiment, where a mobile operating system does not expose, or otherwise make available call event data, to mobile application, a relationship management application can be utilized to capture relevant call data. FIG. 5B is a flow diagram of another embodiment of a method 550 for capturing call event data at a mobile device. The method 550 is performed by processing logic that may comprise hardware (circuitry, dedicated logic, etc.), software (such as is run on a general purpose computer system or a dedicated machine), firmware, or a combination. In one embodiment, the method 550 is performed by a relationship management application (e.g., relationship management application 110, 235, or 245) executed on a mobile device.

Referring to FIG. 5B, processing logic begins by initiating a call from within a relationship management application to a contact or collaborator in a process (processing block 552). In one embodiment, a user selects a name or phone number from their relationship management contact list, and requests their relationship management application to initiate a mobile telephone call. In one embodiment, this request is generated at a mobile application. In another embodiment, the request is generated at a web application on a different device, as discussed below in FIGS. 6A-6B.

Processing logic then hands over the mobile device to a mobile operating system to conduct the requested call (processing block 554). In one embodiment, the phone number corresponding to the contact information selected by the user within the relationship management application is provided to the operating system for placement of the call. Processing logic detects termination of the call and captures a first set of call data (processing block 556). In one embodiment, processing logic determines when a user has resumed use of a mobile relationship management application after placing a call in order to determine that a call has been terminated. In one embodiment, the first set of call data is the data selected by the user in the relationship management system (e.g., a contact name), and any data corresponding to the user-selected data (e.g., a name, address, company, title, associated processes, etc. associated with the contact name).

Processing logic then prompts the user to enter a second set of call data into a relationship management system (processing block 558), and receives the user entered data (processing block 560). For example, additional data related to a selected contact, meeting notes, etc. may be entered by a user. Processing logic then transfers the first and second sets of call data to the relationship management system (processing block 562).

FIG. 5C is a flow diagram of another embodiment of a method for capturing call event data at a mobile device. The method 580 is performed by processing logic that may comprise hardware (circuitry, dedicated logic, etc.), software (such as is run on a general purpose computer system or a dedicated machine), firmware, or a combination. In one embodiment, the method 580 is performed by a relationship management server, such as relationship management server (e.g., 120, 210, or 260).

Referring to FIG. 5C, processing logic begins by receiving user login credentials for a call tracking server (processing block 582). In one embodiment, the call tracking service is a mobile billing service, a VOIP website, or other service that maintains a record of call data. Processing logic periodically crawls the tracking service to obtain call event data (processing block 584). In one embodiment, processing logic utilizes the login credentials to access the tracking service, and then parses the records of telephone calls. From the parsed data, processing logic is able to extract relevant call data such as date, time, telephone number, duration, etc. related to a mobile call event. Therefore, in accordance with the embodiment discussed in FIG. 5C, mobile call events can be tracked within a relationship management system even when a mobile relationship management application is not installed on a mobile telephone.

Figure 6A:
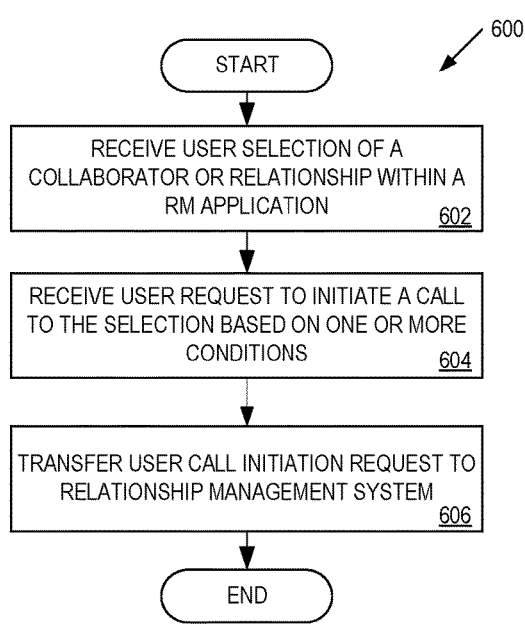
FIG. 6A is a flow diagram of one embodiment of a method for initiating a mobile call event on a mobile device from a different device.

In one embodiment, a relationship management application operating on one device, such as relationship management application 235 operating on a user system 230, can trigger a call event on an associated mobile device, such as mobile device 240. FIG. 6A is a flow diagram of one embodiment of a method 600 for initiating a mobile call event on a mobile device from a different device. The method 600 is performed by processing logic that may comprise hardware (circuitry, dedicated logic, etc.), software (such as is run on a general purpose computer system or a dedicated machine), firmware, or a combination. In one embodiment, the method 600 is performed by a relationship management application at a device, such as application 235 at user system 230.

Referring to FIG. 6A, processing logic begins by receiving user selection of a collaborator or relationship within a relationship management application (processing block 602). In one embodiment, the user selects the collaborator or relationship from a contact list available in the user's relationship management system. The user may also enter a telephone number that the user would like to call via the relationship management system. In one embodiment, the user selection may also include an assignee of a call that is not the user, which causes the assignee to receive a suggestion to make a call, as discussed below. Processing logic receives the user request to initiate a call (processing block 604), which is transferred by processing logic to the relationship management system (processing block 606). In one embodiment, the request includes the contact to be called, the assignee (if any), and one or more conditions, such as a schedule time for the call in the future.

Figure 6B:
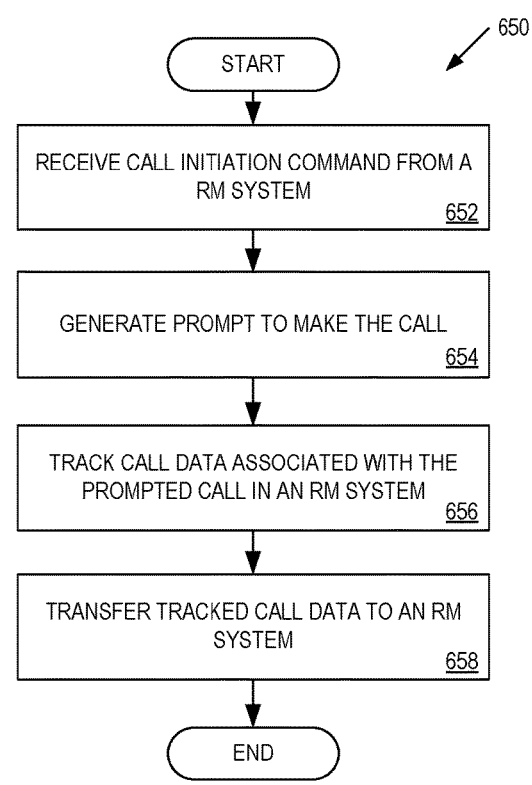
FIG. 6B is a flow diagram of one embodiment of a method for processing a mobile call event on a mobile device initiated from a different device.

FIG. 6B is a flow diagram of one embodiment of a method for processing a mobile call event on a mobile device initiated from a different device. The method 650 is performed by processing logic that may comprise hardware (circuitry, dedicated logic, etc.), software (such as is run on a general purpose computer system or a dedicated machine), firmware, or a combination. In one embodiment, the method 650 is performed by a mobile relationship management application at a mobile device, such as application 245 at mobile device 240.

Referring to FIG. 6B, processing logic begins by receiving a call initiation command from a relationship management system (processing block 652). In one embodiment, the command is routed and delivered to processing logic by relationship management system based on the request data transferred to relationship management system in processing block 606 above. In one embodiment, the request may include an assignee of the call. In this embodiment, a user may be prompted with a suggestion to place a call, where the user receiving the suggestion to place the call is different from the user making the call request in FIG. 6A. Thus, a manager may schedule a suggestion for an employee to make a call that will be tracked by relationship management system.

Processing logic then prompts the identified user to make the call specified by the number in the request (processing block 654) and tracks call data associated with the prompted call (processing block 656). As discussed above in FIGS. 5A and 5B, various forms of call data can be tracked by processing logic. Processing logic then transfers the tracked call data to a relationship management system (processing block 658) to enable the call tracking, notification, and suggestions generation processes discussed above.

Figure 7A:
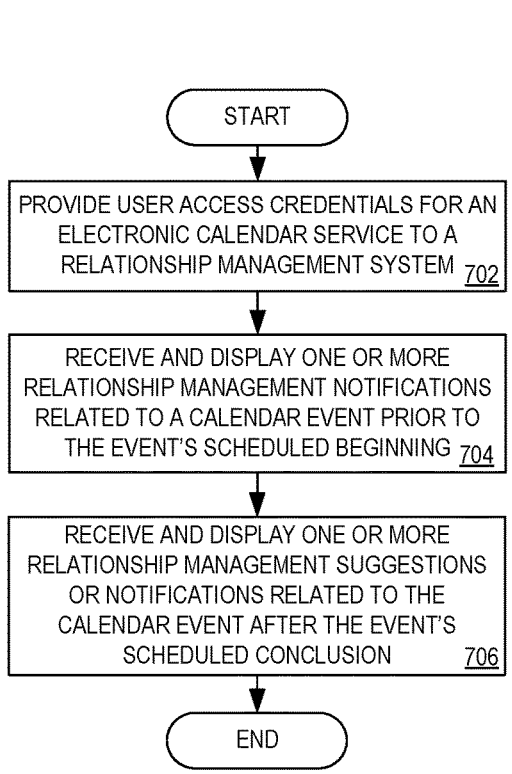
FIG. 7A is a flow diagram of one embodiment of a method for enabling calendar event notifications on a mobile device.

FIG. 7A is a flow diagram of one embodiment of a method for enabling calendar event notifications on a mobile device. The method 700 is performed by processing logic that may comprise hardware (circuitry, dedicated logic, etc.), software (such as is run on a general purpose computer system or a dedicated machine), firmware, or a combination. In one embodiment, the method 700 is performed by a mobile relationship management application at a mobile device, such as mobile application 245 at mobile device 240.

Referring to FIG. 7A, processing logic begins by providing user access credentials for an electronic calendar service to a relationship management system (processing block 702). In one embodiment, the access credentials enable the relationship management system to crawl or otherwise locate calendar events (e.g., appointments, reminders, meetings, etc.) at the electronic calendar service.

Processing logic then receives and displays one or more relationship management notifications related to a calendar event prior to the event's scheduled beginning (processing block 704). As discussed above the notification may include information, obtained from a relationship management system, which is relevant to the calendar event. For example, the notification may indicate the attendees of a scheduled calendar event, whether the attendees belong to a process, the stage of a process, etc. Furthermore, in one embodiment, the notifications can include one or more suggestions, such as suggestions to invite other collaborators in a process to a scheduled meeting, where the scheduled meeting includes external relationships that are attendees/invitees of the meeting and that are also members of the process.

Processing logic later receives and displays one or more relationship management notifications and/or suggestions related to the calendar event after the event's scheduled conclusion (processing block 706). In one embodiment, the suggestions are similar to those discussed above, and can also be generated by a relationship management system based on a determined user pattern of behavior following similar calendar events. For example, the suggestion could be a reminder to call an attendee in the future, a suggestion to schedule a follow up meeting, a suggestion to enter relevant data, action items, etc. discussed during the calendar event, etc. Furthermore, the post-calendar event notifications may occur immediately after the calendar event, at a time in the future determined from a pattern of the user's behavior, or based on context data derived from the calendar event.

In one embodiment, processing logic may also display one or more relationship management notifications and/or suggestions related to the calendar event during the scheduled event. For example, processing logic can prompt a user to enter notes relevant to relationship management process related to the calendar event, as the calendar event is occurring.

Figure 7B:
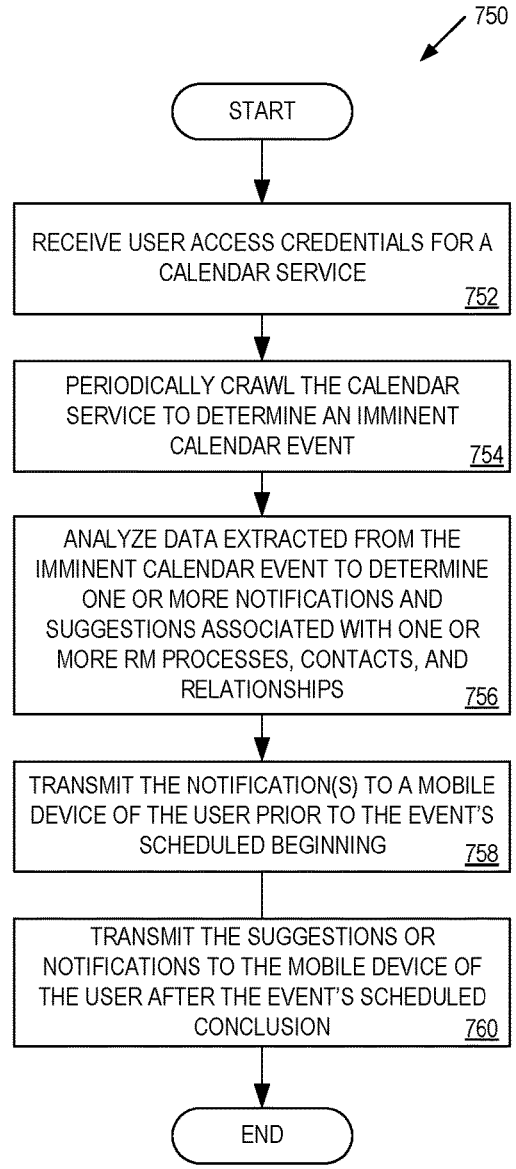
FIG. 7B is a flow diagram of one embodiment of a method for generating calendar event notifications at a relationship management system.

FIG. 7B is a flow diagram of one embodiment of a method for generating calendar event notifications at a relationship management system. The method 750 is performed by processing logic that may comprise hardware (circuitry, dedicated logic, etc.), software (such as is run on a general purpose computer system or a dedicated machine), firmware, or a combination. In one embodiment, the method 750 is performed by a relationship management system (e.g., relationship management server 120, 210 or 260).

Referring to FIG. 7B, processing logic begins by receiving user access credentials for a calendar service (processing block 752). Processing logic utilizes the access credentials to periodically crawl the calendar service to determine one or more imminent calendar events (processing block 754). Furthermore, as discussed above, calendar event data may also be received by processing logic from a mobile device for locally maintained calendar events. In one embodiment, the imminence of an event is a pre-set time, such as a day before the event, an hour before the event, at the time of the event, etc. In another embodiment, a user may configure the determination of when an event is imminent.

Processing logic analyzes data extracted from the imminent calendar event to determine one or more notifications and suggestions associated with one or more relationship management processes, collaborators, or relationships (processing block 756). In one embodiment, a calendar event is analyzed to determine the time, location, attendees, topic, and any additional data available from the calendar event. Processing logic utilizes the data to determine if relationships or collaborators are scheduled to be attendees of the calendar event. Based on this information processing logic can determine relevant processes, potentially relevant collaborators or relationships that were not invited to the calendar event, etc. as discussed above. Furthermore, processing logic utilizes the information to determine post-event suggestions, such as scheduled follow-ups, telephone call events to be made, recurring meeting scheduling, etc. as discussed above. Processing logic then transmits a selected set of the generated notifications and suggestions, to the mobile device, prior to the calendar event's scheduled beginning (processing block 758). In one embodiment, the selected set of notifications and suggestions inform the user of relevant relationship management system information prior the scheduled event. Processing logic also transmits post-calendar event notifications and/or suggestions to the mobile device after the scheduled conclusion of the calendar event (processing block 760). As discussed herein, the post-event suggestions may include one or more suggestions for a user to enter data into the relationship management system, such as data discussed during the event. Furthermore, the post-event suggestions can be delivered immediately after the scheduled conclusion of the event, at a user-selected time after the event, or at a time based on an observed pattern of the user's responses to post-event suggestions.

Figure 8:
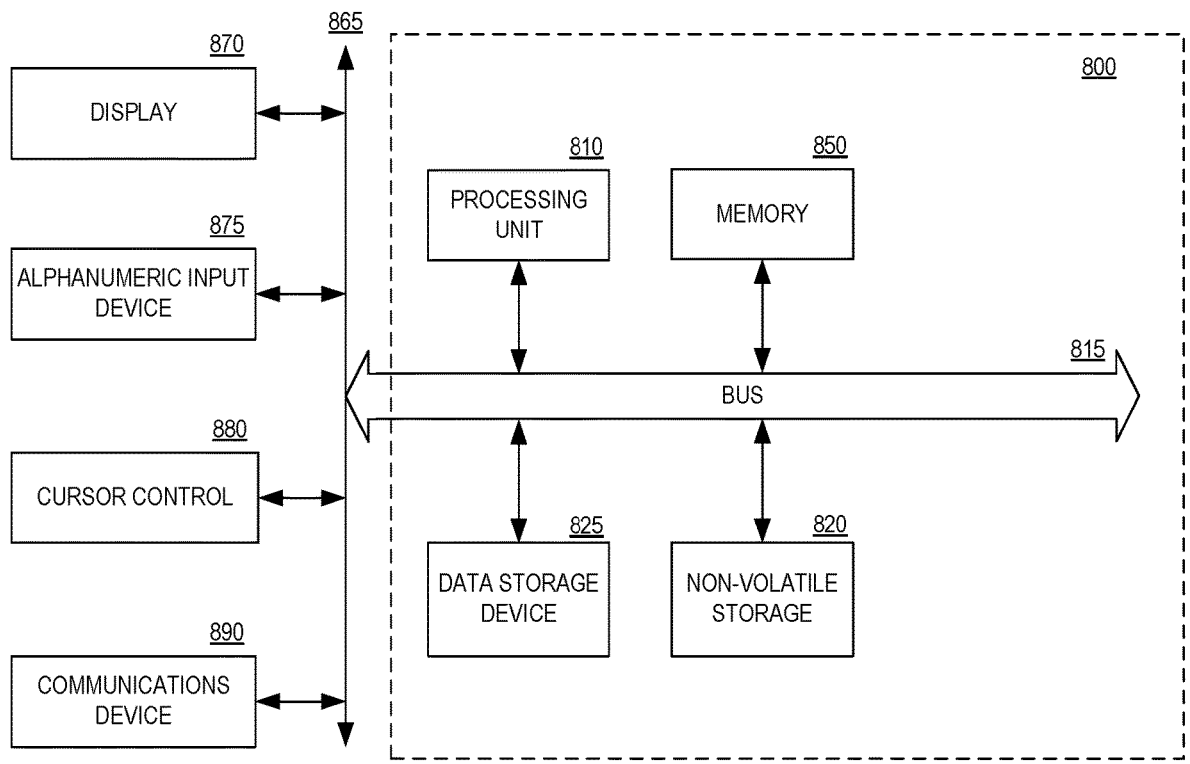
FIG. 8 is one embodiment of a computer system that may be used in accordance with an embodiment of the invention.

FIG. 8 is one embodiment of a computer system that may be used with the present invention. It will be apparent to those of ordinary skill in the art, however that other alternative systems of various system architectures may also be used.

The data processing system illustrated in FIG. 8 includes a bus or other internal communication means 815 for communicating information, and a processing unit 810 coupled to the bus 815 for processing information. The system further comprises a random access memory (RAM) or other volatile storage device 850 (referred to as memory), coupled to bus 815 for storing information and instructions to be executed by processing unit 810. Main memory 850 also may be used for storing temporary variables or other intermediate information during execution of instructions by processing unit 810. The system also comprises a read only memory (ROM) and/or non-volatile storage 820 coupled to bus 815 for storing static information and instructions for processing unit 810, and a data storage device 825 such as a magnetic disk or optical disk and its corresponding disk drive. Data storage device 825 is coupled to bus 815 for storing information and instructions.

The system may further be coupled to a display device 870, such as a cathode ray tube (CRT) or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processing unit 810. An additional user input device is cursor control device 880, such as a touchpad, mouse, a trackball, stylus, or cursor direction keys coupled to bus 815 through bus 865 for communicating direction information and command selections to processing unit 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass data storage device 825, or other storage medium locally or remotely accessible to processing unit 810.

It will be apparent to those of ordinary skill in the art that the system, method, and process described herein can be implemented as software stored in main memory 850 or read only memory/non-volatile storage 820 and executed by processing unit 810. This control logic or software may also be resident on an article of manufacture comprising a computer readable medium having computer readable program code embodied therein and being readable by the mass data storage device 825 and for causing the processing unit 810 to operate in accordance with the methods and teachings herein.

The present invention may also be embodied in a handheld or portable device containing a subset of the computer hardware components described above. For example, the handheld device may be configured to contain only the bus 815, the processing unit 810, and memory 850 and/or data storage device 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 810, a data storage device 825, a bus 815, and memory 850, and only rudimentary communications mechanisms, such as a small touchscreen that permits the user to communicate in a basic manner with the device. In general, the more special-purpose the device is, the fewer of the elements need be present for the device to function.

Figure 9:
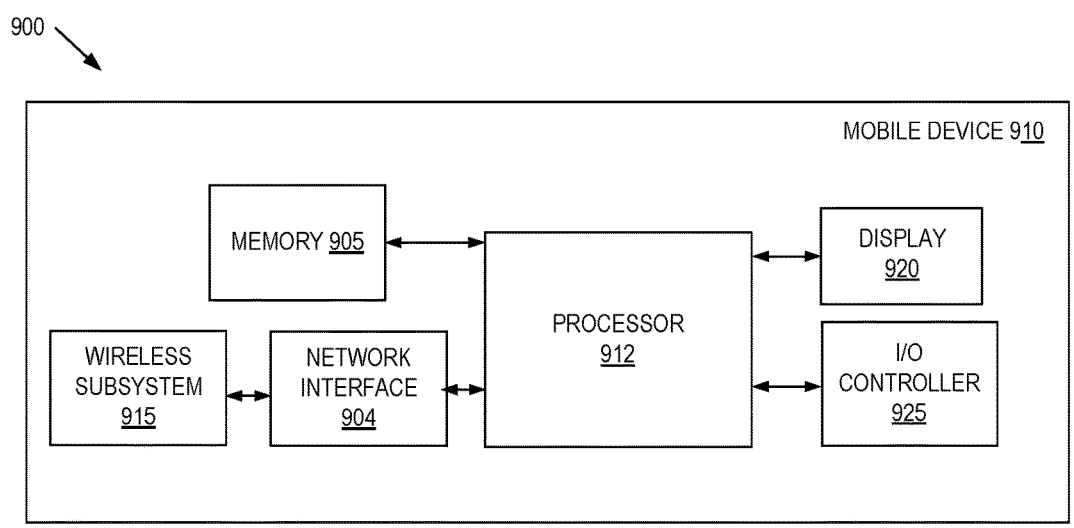
FIG. 9 is one embodiment of a mobile device that may be used in accordance with an embodiment of the invention.

FIG. 9 is block diagram of one embodiment 900 of a mobile device. Mobile device 910 provides additional details for mobile device discussed above in FIG. 2A.

In one embodiment, mobile device 910 is a system, which may include one or more processors 912, a memory 905, I/O controller 925, network interface 904, and display 920. Mobile device 910 may also include a number of processing modules, which may be implemented as hardware, software, firmware, or a combination. It should be appreciated that mobile device 910 may also include, although not illustrated, a user interface (e.g., keyboard, touch-screen, or similar devices), a power device (e.g., a battery), as well as other components typically associated with electronic devices. Network interface 904 may also be coupled to a number of wireless subsystems 915 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 904 and wireless subsystem 915 couple mobile device 910 to a network.

Memory 905 may be coupled to processor 912 to store instructions for execution by processor 912. In some embodiments, memory 905 is non-transitory. It should be appreciated that embodiments of the invention as described herein may be implemented through the execution of instructions, for example as stored in the memory 905 or other element, by processor 912 of mobile device 910 and/or other circuitry of mobile device 910 and/or other devices. Particularly, circuitry of mobile device 910, including but not limited to processor 912, may operate under the control of a program, routine, or the execution of instructions to execute methods or processes in accordance with embodiments of the invention. For example, such a program may be implemented in firmware or software (e.g. stored in memory 905 and/or other locations) and may be implemented by processors, such as processor 912, and/or other circuitry of mobile device 910. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 910 itself and/or some or all of the functions, engines or modules described herein may be performed by another system connected through I/O controller 925 or network interface 904 (wirelessly or wired) to mobile device 910. Thus, some and/or all of the functions may be performed by another system and the results or intermediate calculations may be transferred back to mobile device 910. In some embodiments, such other device may comprise a server, such as relationship management server 210 or 260 configured to process information in real time or near real time. In some embodiments, the other device is configured to predetermine the results, for example based on a known configuration of the mobile device 910.

In one embodiment, the access to electronic communications, tracking of communications, extraction of contact, collaborator, and relationship data from the electronic communications, and generation of mobile event notifications is predicated on privacy controls maintained by a relationship management server. The privacy controls enable users to select what data should be shared with participants (i.e., relationships and collaborators) within a process, what data should be tracked, what data from one user can be shared, displayed, or used by a second user, etc. In one embodiment, these privacy controls may initially be set to a maximum degree of privacy, such that no data is shared, obtained, or tracked. A user may then opt-into one or more of the data acquisition, tracking, and sharing processes discussed herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A non-transitory computer-readable medium having stored thereon instructions that, when executed by one or more processors, are configurable to cause the one or more processors to:

receiving, from a remote mobile electronic communications device, an indication corresponding to a call associated with a user of a relationship management system running on a host electronic computing system to store and analyze information related to the call, wherein the call is handled by the remote mobile electronic communications device;

analyzing, with the host electronic computing system, the call to determine relationship management information related to one or more participants in the call based on information from the relationship management system;

retrieving, from a database of the relationship management system, context information related to the call, to the user and to at least one of the one or more participants in the call;

generating pre-call data from the context information, wherein the pre-call data comprises at least a relationship management system suggestion based on previous monitored activity for at least one of the one or more participants in the call; and transmitting, to the remote mobile electronic communications device, the pre-call data associated with the call on the mobile electronic communications device of the user, wherein the pre-call data is received when a user receives an incoming call but has not yet accepted the call or begins to place an outgoing telephone call, but has not yet placed the telephone call.

2. The non-transitory computer-readable medium of claim 1 wherein the pre-call relationship management notifications comprise at least a status of a deal.

3. The non-transitory computer-readable medium of claim 1 wherein the pre-call relationship management notifications comprise at least a dollar amount of a deal.

4. The non-transitory computer-readable medium of claim 1 wherein the pre-call relationship management notifications comprise at least a date of a previous associated call.

5. The non-transitory computer-readable medium of claim 1 wherein the mobile electronic communications device comprises a cellular telephone and the call comprises a voice call.

6. The non-transitory computer-readable medium of claim 1 wherein the mobile electronic communication device comprises a mobile computing device and the call comprises a video call.

7. The non-transitory computer-readable medium of claim 6 wherein the mobile computing device comprises a tablet.

8. The non-transitory computer-readable medium of claim 6 wherein the mobile computing device comprises a laptop computer.

9. The non-transitory computer-readable medium of claim 1 wherein the mobile electronic communication device comprises a wearable computing device and the call comprises a voice call.

10. The non-transitory computer-readable medium of claim 1 wherein the call comprises an outgoing call.

11. The non-transitory computer-readable medium of claim 1 wherein the call comprises an incoming call.

12. The non-transitory computer-readable medium of claim 1 wherein the host electronic computing system performs a query for the relationship management information on a subset of relevant data within the relationship management system.

13. The non-transitory computer-readable medium of claim 1 further comprising instructions that, when executed by the one or more processors, are configurable to cause the one or more processors to:

analyze, using one or more machine learning techniques patterns related to the one or more participants in the call and the relationship management information to determine one or more future relationship management actions.

14. The non-transitory computer-readable medium of claim 13 wherein the one or more future relationship management actions comprises at least a followup.

15. The non-transitory computer-readable medium of claim 13 wherein the one or more future relationship management actions comprises at least entering additional information in the relationship management system.

16. A system comprising:
at least one memory device;
one or more hardware processors coupled with the at least one memory device, the one or more processors configurable to receive, from a remote mobile electronic communications device, an indication corresponding to a call associated with a user of a relationship management system to store and analyze information related to the call, wherein the call is handled by the remote mobile electronic communications device, to analyze the call to determine relationship management information related to one or more participants in the call based on information from the relationship management system, to retrieve, from a database of the relationship management system, context information related to the call, to the user and to at least one of the one or more participants in the call, to generate pre-call data from the context information, wherein the pre-call data comprises at least a relationship management system suggestion based on previous monitored activity for at least one of the one or more participants in the call; and to transmit, to the remote mobile electronic communications device, the pre-call data associated with the call on the mobile electronic communications device of the user, wherein the pre-call data is received when a user receives an incoming call but has not yet accepted the call or begins to place an outgoing telephone call, but has not yet placed the telephone call.

17. The system of claim 16 wherein the pre-call relationship management notifications comprise at least a status of a deal.

18. The system of claim 16 wherein the pre-call relationship management notifications comprise at least a dollar amount of a deal.

19. The system of claim 16 wherein the pre-call relationship management notifications comprise at least a date of a previous associated call.

20. The system of claim 16 wherein the mobile electronic communications device comprises a cellular telephone and the call comprises a voice call.

21. The system of claim 16 wherein the mobile electronic communication device comprises a mobile computing device and the call comprises a video call.

22. The system of claim 21 wherein the mobile computing device comprises a tablet.

23. The system of claim 21 wherein the mobile computing device comprises a laptop computer.

24. The system of claim 16 wherein the mobile electronic communication device comprises a wearable computing device and the call comprises a voice call.

25. The system of claim 16 wherein the call comprises an outgoing call.

26. The system of claim 16 wherein the call comprises an incoming call.

27. The system of claim 16 wherein the host electronic computing system performs a query for the relationship management information on a subset of relevant data within the relationship management system.

28. The system of claim 16 wherein the one or more hardware processors are further configurable to analyze, using one or more machine learning techniques patterns related to the one or more participants in the call and the relationship management information to determine one or more future relationship management actions.

29. The system of claim 28 wherein the one or more future relationship management actions comprises at least a followup.

30. The system of claim 28 wherein the one or more future relationship management actions comprises at least entering additional information in the relationship management system.

* * * * *